Fig. 1

INVENTOR.
WILLIAM H. GILGORE
WAYNE H. ROYER
BY Otto Mueller
Attorney

3,272,156
OVEN HEATING SYSTEM
William H. Gilgore, Hellam, and Wayne H. Royer, York, Pa., assignors to Read Corporation, a corporation of Delaware
Filed Jan. 31, 1964, Ser. No. 341,555
9 Claims. (Cl. 107—57)

This invention relates to commercial baking ovens wherein products to be baked are transported through the baking chamber by endless conveying means, and more particularly to an air circulating system for the same.

For most satisfactory baking results, some products may require more top heat while others may require more bottom heat, for example, pies generally require more bottom heat, while rolls and buns generally require more top heat, and even different types of bread may require the application of more top or bottom heat. An object of our invention is to provide a practical, efficient, flexible and simple circulating system for distributing and directionally controlling the circulation of the heated air in the baking chamber whereby to attain optimum baking conditions for a variety of baked products.

Another object is to provide a novel construction and arrangement of air circulating apparatus in an oven for selectively discharging the heated baking chamber air upwardly or downwardly against the products to be baked independently in each of a plurality of zones in the course of travel of the products through the oven, whereby the direction of flow of the heated air in either zone may be independently reversed with respect to the direction of flow in the other zone.

A further object is to provide in an oven having endless conveying means for transporting products to be baked in an upper and a lower product run, an air circulating system constructed and arranged for selectively controlling the discharge of heated air in an upward or downward direction against the product in the upper product run, and for selectively controlling the discharge of heated air in an upward or downward direction against the product in the lower product run, whereby air may be discharged downwardly in the upper run independently of the direction of air flow in the lower run, if for example more top heat or steam is desired on the product in the upper run, or whereby air may be discharged downwardly in the lower run independently of the direction of air flow in the upper run, if for example more top heat or top coloring on the product is desired in the lower run.

Still another object is to provide in an oven having an upper and a lower baking coveyor run, baking zones individual thereto and a hot air circulating system for said zones adapted to facilitate maintenance of temperature differentials in the upper and lower baking zones.

Other objects and advantages of the invention will be apparent from the following description taken in connection with the accompanying drawings, in which.

The oven construction illustrated in the drawings includes a housing 10 of longitudinally elongated generally rectangular shape, defined by a top wall 12, a front wall 14, a rear wall 16, side walls 18 and 20, and a base 22, which walls are made up of inside and outside sheet metal plates or panels, between which inside and outside plates or panels is interposed suitable heat insulating material, as indicated at 24.

Figure 1:
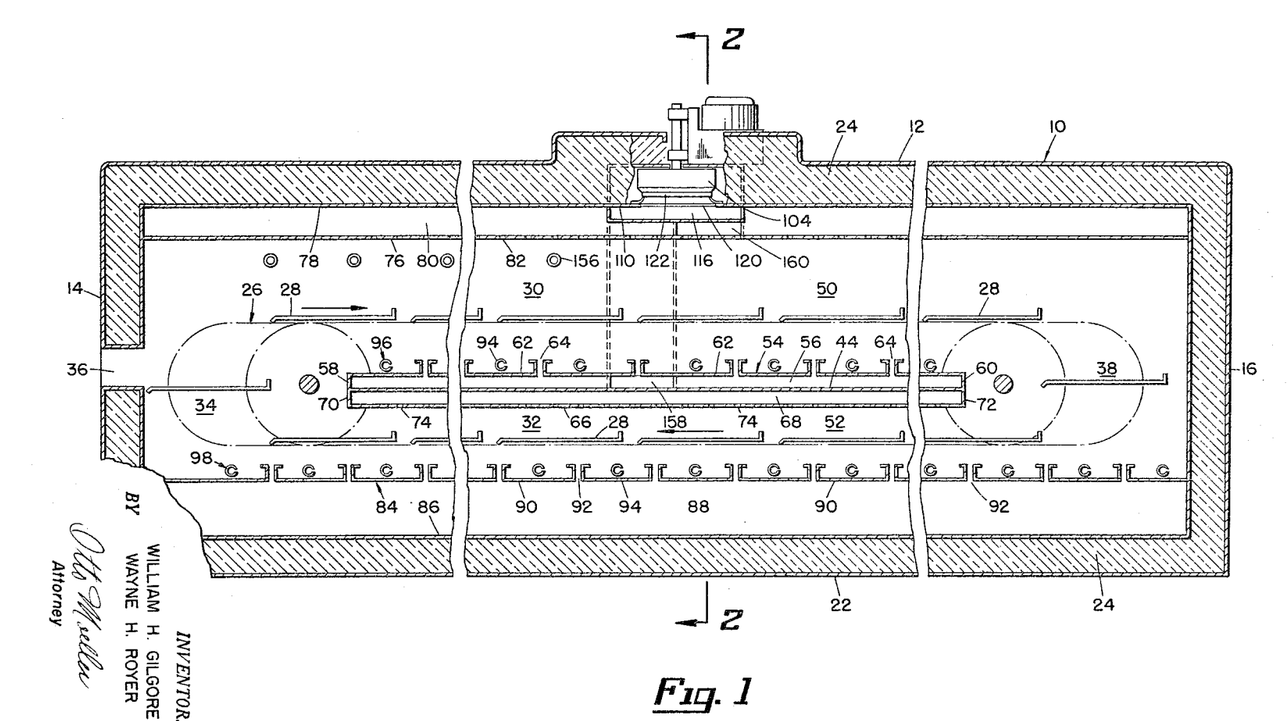
FIGURE 1 is a longitudinal vertical section through a direct fired baking oven embodying the present invention, parts being shown in elevation.

The oven is of type commonly referred to as a single lap tray type oven, wherein an endless tray conveyor 26, traveling in the direction of the arrows in FIGURE 1, conveys the trays 28 along a longitudinally extending upper run 30 from the front to the rear of the oven, and along a longitudinally extending lower run 32 from the rear to the front of the oven. The trays 28 are elevated from the lower run 32 to the upper run 30 along an ascending run 34 adjacent an opening 36 in the front wall of the oven, and are lowered from upper run 30 to lower run 32 along a descending run 38 adjacent the rear wall of the oven.

The tray conveyor 26, illustrated rather diagrammatically in FIGURE 1 may be of any suitable form well known in the art, and includes endless chains 40 and 42, one at each side of the oven. The chains 40 and 42 define the aforesaid runs of the tray conveyor 26, and at the turns from one run to the other are trained over suitable sprockets and guide shoes in a manner conventional in the art. Pivotally supported between the chains 40 and 42 are a plurality of transversely extending equidistantly spaced trays 28. Suitable means is provided for maintaining the trays 28 in horizontal position as they are conveyed throughout the oven. Such means for stabilizing the trays is well known in the art, and since it does not constitute a part of the present invention, it has not been shown in the drawings.

A horizontal imperforate partition 44 is disposed approximately midway between the upper and lower runs 30 and 32 of the tray conveyor 26, and extends laterally from inner sheet 46 of oven side wall 18 to inner sheet 48 of oven side wall 20 and longitudinally from as nearly adjacent the ascending run 34 of tray conveyor 26 as practicable to as nearly adjacent the descending run 38 of tray conveyor 26 as practicable, whereby to divide the oven into an upper baking zone 50 and a lower baking zone 52. A horizontal perforate partition 54, coextensive with partition 44 and spaced thereabove, forms therebetween a shallow plenum chamber 56, closed at its forward and rearward ends by end closures 58 and 60. The perforate partition 54 is preferably formed of a plurality of transversely extending plates 62 longitudinally spaced apart to form therebetween vents or slots 64, distributed substantially uniformly over the area of the partition 54, providing communication between plenum chamber 56 and upper baking zone 50.

A horizontal perforate partition 66, coextensive with partition 44 and spaced therebelow, forms therebetween a shallow plenum chamber 68, closed at its forward and rearward ends by end closures 70 and 72. Horizontal partition 66 is provided with a plurality of apertures 74 distributed substantially uniformly over the extent thereof, providing communication between the plenum chamber 68 and lower baking zone 52. If desired, the partition 66 can be formed in the same manner as partition 54 providing slots or vents in place of the apertures 74.

A horizontal perforate partition 76, disposed below the inner or crown sheet 78 of the oven top wall 12, extends laterally the width of the interior of the oven and longitudinally at least substantially coextensive with the plenum chamber 56. The partition 76 may extend the full length of the oven, as shown in the drawings, however, it may terminate short of the ends of the oven without materially affecting the efficient functioning of our improved oven. The partition 76 forms with the inner sheet 78 of the oven top wall 12, a shallow plenum chamber 80 at the top of the upper baking zone 50. Partition 76 is provided with a plurality of apertures 82 distributed substantially evenly over the extent thereof providing communication between plenum chamber 80 and upper baking zone 50. If desired, the partition 76 can be formed in the same manner as partition 54 providing slots or vents in place of the apertures 82.

A horizontal perforate partition 84, disposed above the inner sheet 86 of the oven base 22, extends laterally the width of the interior of the oven and longitudinally at least substantially coextensive with the plenum chamber 68. The partition 84 may extend the full length of the oven, as shown in the drawings, however, it may terminate short of the ends of the oven without materially affecting the efficient functioning of our improved oven. The partition 84 forms with the inner sheet 86 of the oven base 22, a shallow plenum chamber 88. As shown, the perforate partition 84 is preferably formed of a plurality of transversely extending plates 90 longitudinally spaced apart to form therebetween vents or slots 92, distributed substantially uniformly over the area of the partition 84, providing communication between the plenum chamber 88 and lower baking zone 52.

The pans of dough to be baked are introduced through oven opening 36 and loaded onto successive trays 28. These trays are preferably of open grille type construction, well known in the industry. The tray conveyor 26 transports the pans of dough through upper baking zone 50 along upper tray conveyor run 30 from the front to the rear of the oven and then through lower baking zone 52 along the lower or return run 32.

The heating system for the oven includes a plurality of transversely extending longitudinally spaced fluid fuel burners 94, which may be of any suitable conventional type, well known in the art. The burners 94 are arranged in an upper series 96 disposed between the plenum chamber 56 and the upper run 30 of the tray conveyor 26, and a lower series 98 between the plenum chamber 88 and the lower run 32 of the tray conveyor 26.

Figure 2:
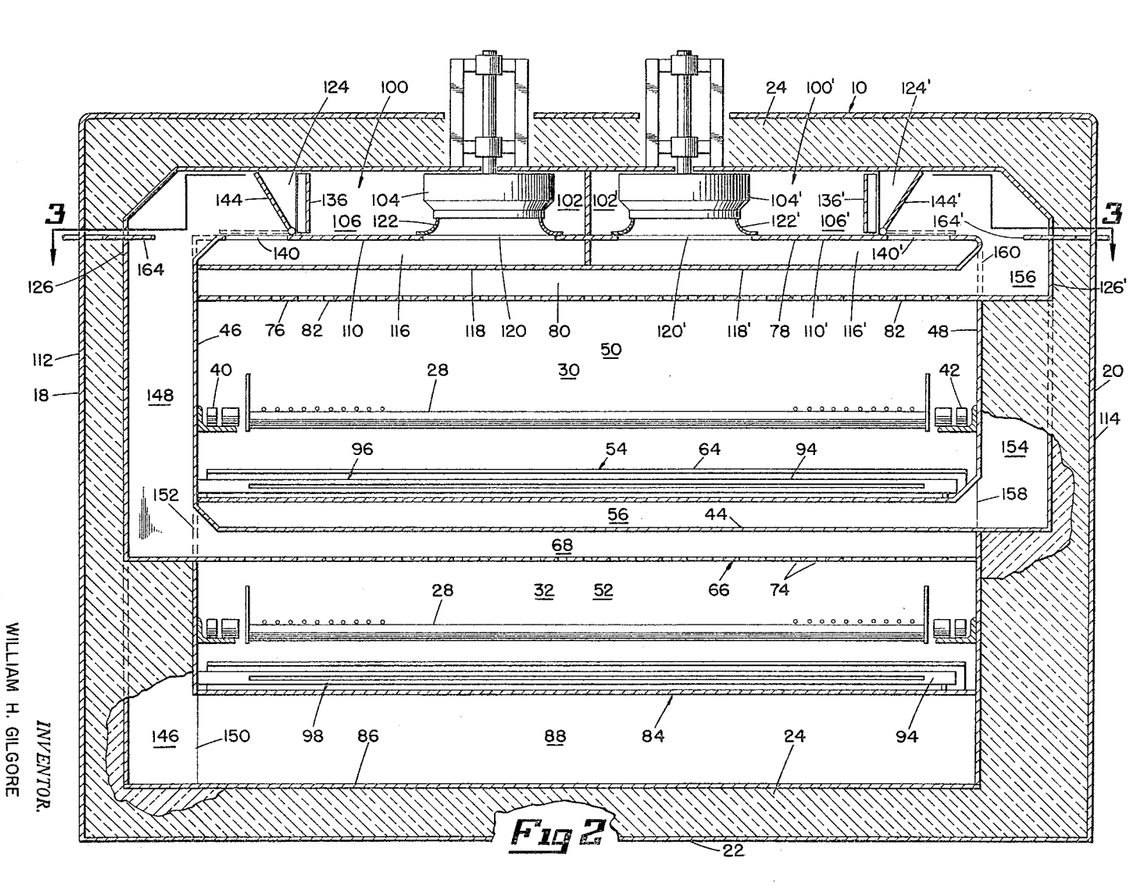
FIGURE 2 is a sectional view taken on the line 2—2 of FIGURE 1.
Figure 3:
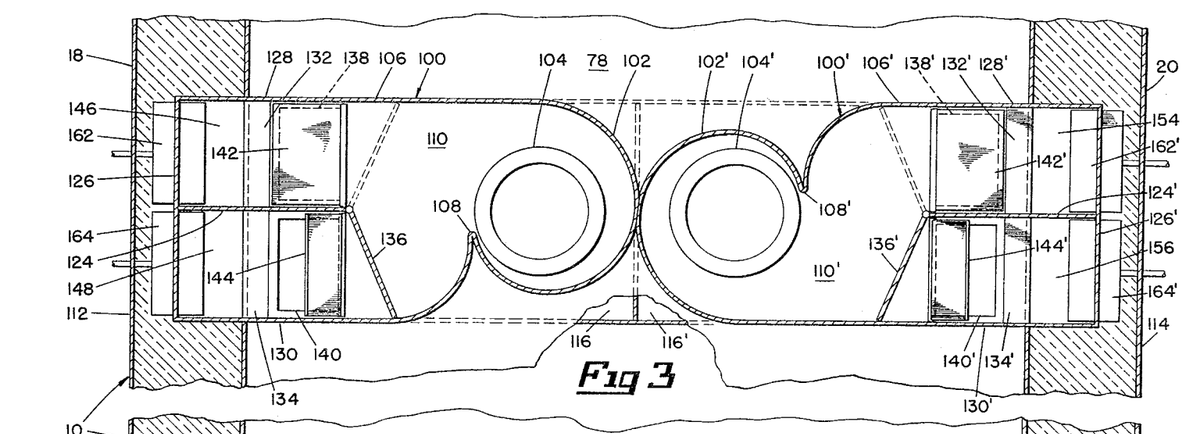
FIGURE 3 is a sectional view taken on the line 3—3 of FIGURE 2.

Disposed approximately midway between the ends of the oven within the top wall 12 thereof are a pair of laterally adjacent transversely extending housings 100 and 100', the adjacent inner end portions of which, in horizontal cross section, have a spiral shaped configuration forming fan chambers 102 and 102' for the fans 104 and 104', as best shown in FIGURE 3. The laterally outer end portions of housings 100 and 100', in horizontal cross section, have a generally rectangular shaped configuration to form distributing ducts 106 and 106' communicating with the discharge sides of fans 104 and 104' through restricted openings 108 and 108' between the distributing ducts 106, 106' and the fan chambers 102, 102'. As shown in the drawings, the inner or crown sheet 78 of the oven top wall 12 preferably forms the bottom walls 110 and 110' of the housings 100 and 100'. As best shown in FIGURES 2 and 3, the laterally outermost end portions of the distributing ducts 106 and 106', except for their bottom walls 110 and 110', project into the space between the outer sheet 112 and the inner sheet 46 of oven side wall 18, and the outer sheet 114 and the inner sheet 48 of oven side wall 20.

Subjacent the housings 100 and 100' are a pair of laterally adjacent transversely extending shallow collecting ducts 116 and 116' which extend, respectively, to inner sheets 46 and 48 of oven side walls 18 and 20. The collecting ducts 116 and 116' extend through the plenum chamber 80 and have their bottom walls 118 and 118' spaced above the partition 76 that forms the bottom of plenum chamber 80. The bottom walls 110 and 110' of the housings 100 and 100', which walls also form top walls for the collecting ducts 116 and 116', are provided with circular openings 120 and 120' embraced by inlet rings 122 and 122' of the fans 104 and 104' providing communication between the collecting ducts 116 and 116' and the intake sides of the fans 104 and 104'.

Referring to the housing 100 at the right side of the oven when viewed from the front thereof, that portion of the housing 100 forming the distributing duct 106 is provided with a vertical transversely extending partition 124 projecting inwardly from the outer end wall 126 of the housing 100, as best shown in FIGURE 3. The partition 124 is disposed midway between the front and rear side walls 128 and 130 of the distributing duct 106 forming therein forward and rearward ducts 132 and 134. The inner edge of the partition 124 has a flapper valve or damper 136 pivotally connected thereto for horizontal swinging movement about a vertical axis, which when swung to its full line position, as shown in FIGURE 3, closes off the duct 134 and opens duct 132, and when swung to its phantom line position closes off the duct 132 and opens duct 134. Suitable means, not shown, accessible from outside the oven is provided for selectively swinging the valve or damper 136 to one or the other of the aforesaid positions. The bottom wall 110 of the ducts 132 and 134 of the distributing duct 106, is provided with openings 138 and 140, the former providing communication between duct 132 and collecting duct 116, and the latter providing communication between duct 134 and collecting duct 116. The openings 138 and 140 are provided with pivotally mounted flapper valves or dampers 142 and 144 arranged for vertically swinging movement about a horizontal axis for selectively uncovering and covering the openings 138 and 140. Suitable means, not shown, accessible from outside the oven is provided for conjoint operation of the valves or dampers 142 and 144, so that when one valve or damper is moved to covering position, the other valve or damper is moved to uncovering position.

The above described construction of the details of the housing 100 applies in the same manner to the housing 100', and the same reference numerals bearing a prime mark have been employed to designate similar parts.

A pair of side by side vertical ducts 146 and 148 are disposed within the oven side wall 18 adjacent the inner sheet 46 thereof. The upper end of the vertical duct 146 communicates with the laterally outer end of the duct 132 of the distributing duct 106, and the lower end thereof communicates with one side of the bottom plenum chamber 88 of the lower baking zone 52 through an opening 150 in the inner sheet 46 of oven side wall 18. The upper end of the vertical duct 148 communicates with the laterally outer end of the duct 134 of the distributing duct 106, and the lower end thereof communicates with one side of the upper plenum chamber 68 of the lower baking zone 52 through an opening 152 in the inner sheet 46 of oven side wall 18.

A pair of side by side vertical ducts 154 and 156 are disposed within the oven side wall 20 adjacent the inner sheet 48 thereof. The upper end of the vertical duct 154 communicates with the laterally outer end of the duct 132' of the distributing duct 106', and the lower end thereof communicates with one side of the bottom plenum chamber 56 of the upper baking zone 50 through an opening 158 in the inner sheet 48 of oven side wall 20. The upper end of the vertical duct 156 communicates with the laterally outer end of the duct 134' of the distributing duct 106', and the lower end thereof communicates with one side of the upper plenum chamber 80 of the upper baking zone 50 through an opening 160 in the inner sheet 48 of oven side wall 20.

In operation, with the various valves or dampers in their full line positions, it will be seen that air from the outlet side of fan 104 is discharged through restricted opening 108 into distributing duct 106. Since valve 136 is positioned to close off duct 134, the air is discharged into duct 132, and since valve 142 is positioned to close the opening 138 in the bottom of duct 132, the air is discharged from duct 132 into the upper end of vertical duct 146. From the lower end of duct 146, the air is discharged through opening 150 into the lower plenum chamber 88 of the lower baking zone of the oven. The air is discharged upwardly from plenum chamber 88 through the slots or vents 92 in the partition 84, and since the slots or vents 92 are distributed over an area coextensive at least with the plenum chamber 68, as previously described, a substantially uniform upward flow of air is provided throughout the lower baking zone 52.

The air is withdrawn from the lower baking zone 52 into the plenum chamber 68 through the apertures 74 in partition 66. From plenum chamber 68, the air flows through opening 152 into vertical duct 148, then into duct 134 of the distributing duct 106. Since the opening 140 in the bottom of duct 134 is closed by valve 136, the air flows from duct 134 through opening 140 into collecting duct 116 and then through opening 120 to the intake or suction side of the fan 104.

It is frequently desirable to provide more top heat on the products being baked as they are transported along the lower run 32 of the tray conveyor 26, as for example if a browner top crust is desired on bread being baked, also more top heat is desirable when baking such products as rolls or cheese cake. For this purpose, our air circulating system as described above provides a simple and inexpensive construction whereby the direction of flow of the air in the lower heating zone 52 is reversed. To accomplish such reversal of air flow, valve or damper 136 is moved to its phantom line position to close off duct 132 and open duct 134, and valves or dampers 142 and 144 are swung to a position uncovering opening 138 in the bottom of duct 132 and covering opening 140 in the bottom of duct 134. Now the air from the discharge side of fan 104 will flow through duct 134, then downwardly through vertical duct 148, then through opening 152 into upper plenum chamber 68 of the lower baking zone 52. From plenum chamber 68, the air is discharged through apertures 74 in partition 66 downwardly through lower baking zone 52 and is withdrawn into lower plenum chamber 88 through the slots or vents 92 of partition 84. From plenum chamber 88, the flow of air is through opening 150 into the lower end of vertical duct 146, then from the upper end of vertical duct 146 into duct 132, then through opening 138 in the bottom of duct 132 into collecting duct 116 and finally through opening 120 to the intake or suction side of the fan 104.

By manipulating valves or dampers 136', 142' and 144' in the same manner that counterpart valves or dampers 136, 142 and 144 are manipulated, as above described, it will be evident that a circulation of air upwardly through the upper baking zone 50 may be effected, or selectively when, for example, it is desired to direct more steam from conventional steam conduits 156 against the product, to effect a circulation of air downwardly through upper baking zone 50.

Thus, with the valves or dampers in the positions as shown in the drawings, the path of the circulating air will be from the discharge side of fan 104' into duct 132', thence into vertical duct 154, from the lower end of which it flows through the opening 158 in the inner sheet 48 of side wall 20 into the lower plenum chamber 56 of the upper baking zone 50. From plenum chamber 56 the air passes through the vents or slots 64 of partition 54, flows upwardly through upper baking zone 50 and is withdrawn into upper plenum chamber 80 through the apertures 82 in partition 76. From plenum chamber 80, the air flows through opening 160 into vertical duct 156, thence into duct 134'. From duct 134' the air flows through opening 140' into collecting duct 116' and then through opening 120' to the suction side of the fan 104'.

By changing the position of the valves or dampers 136', 142' and 144' in the same manner as set forth above in the description of the operation of counterpart valves or dampers 136, 142 and 144, the direction of flow of the circulating air through the upper baking zone 50 is reversed. The flow from the discharge side of fan 104' will now be through duct 134' into vertical duct 156, thence through opening 160 into upper plenum chamber 80. From plenum chamber 80 the air is discharged downwardly through apertures 82 in partition 76 into upper baking zone 50 and is withdrawn into lower plenum chamber 56 through the slots or vents 64 of partition 54. From plenum chamber 56, the flow of air is through opening 158 into the lower end of vertical duct 154, then from the upper end of vertical duct 154 into duct 132', then through opening 138' in the bottom of duct 132' into collecting duct 116' and finally through opening 120' to the suction side of the fan 104'.

From the above description it is apparent that the circulation of air through each of the upper and lower baking zones is selectively and independently reversible.

Horizontally adjustable slide dampers 162 and 164, adapted to be manipulated from outside the oven, are disposed in the vertical ducts 146 and 148 for independently controlling the volume of air circulated upwardly or downwardly through the lower baking zone 52. Similar dampers 162' and 164' are disposed in the vertical ducts 154 and 156 for independently controlling the volume of air circulated upwardly or downwardly through the upper baking zone 50.

Figure 4:
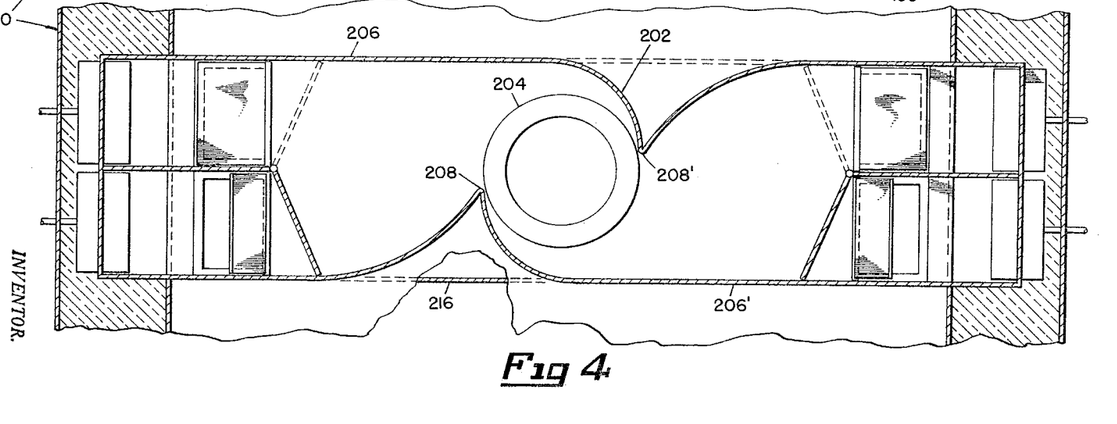
FIGURE 4 is a sectional view similar to the sectional view shown in FIGURE 3, embodying a modified form of the invention.

In FIGURE 4 there is shown a modified form of the invention which is the same in all respects as the previously described form of the invention except for the fact that the distributing ducts 206 and 206', corresponding to distributing ducts 106 and 106', communicate through restricted openings 208 and 208' with a common fan chamber 202 housing a single fan 204. Additionally, in place of the separate collecting ducts 116 and 116' of the first form of the invention, a common collecting duct 216 is employed that communicates with the intake side of the fan 204.

In FIGURES 5 through 8 there is illustrated a modified construction and arrangement of duct means for the air circulating system. As in the form of the invention first described, there is provided in the oven top wall 220, a pair of laterally adjacent transversely extending housings 222 and 224, the adjacent inner end portions of which define fan chamber 226 and 228 for the fans 230 and 232 and the outer end portions of which define distributing ducts 234 and 236.

Figure 6:
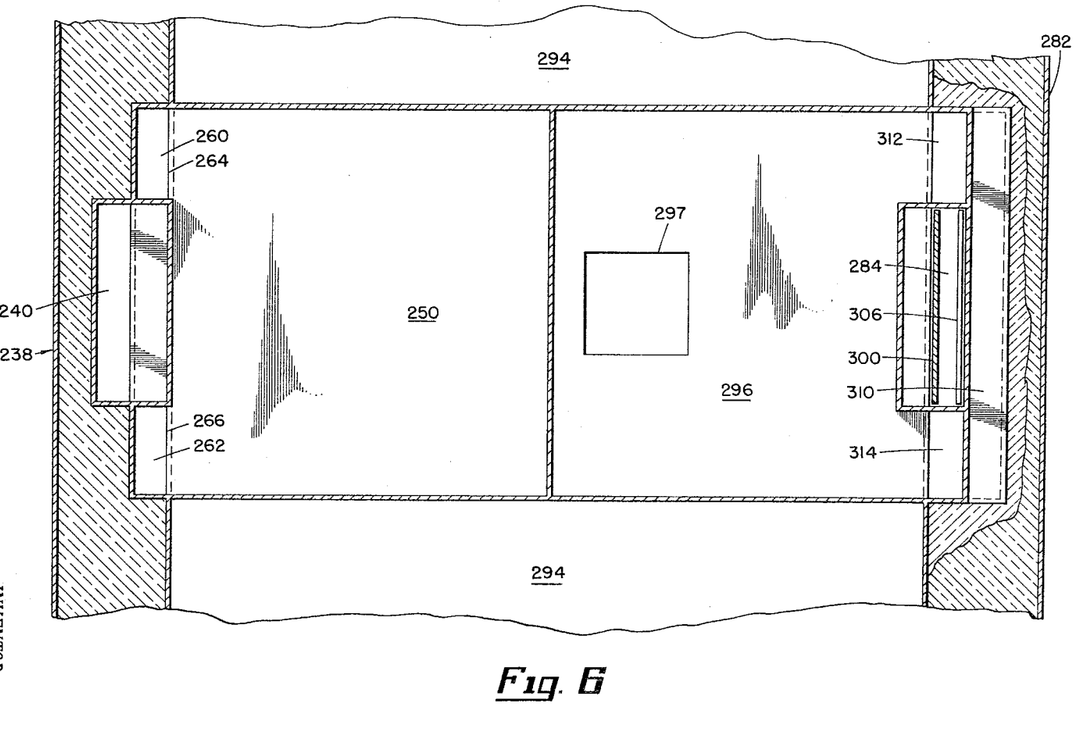
FIGURE 6 is a sectional view taken on line 6—6 of FIGURE 5.
Figure 7:
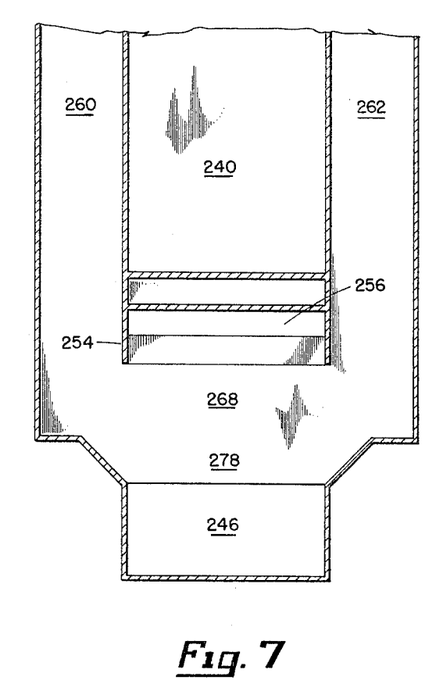
FIGURE 7 is a sectional view taken on line 7—7 of FIGURE 5.

Within oven side wall 238 is a vertical duct 240 arranged to communicate at its upper end with the laterally outer end of distributing duct 234 and at its lower end with the lower plenum chamber 242 of lower baking zone 244 through inwardly directed duct or passage 246, whereby air from the discharge side of fan 230 is introduced into plenum chamber 242. Air from plenum chamber 242 is directed upwardly through lower baking zone 244, as described in the first form of the invention, and is withdrawn therefrom into the upper plenum chamber 248 of the lower baking zone 244. Air from plenum chamber 248 is returned to collecting duct 250, by duct means to be described, for withdrawal through opening 252 to the intake side of the fan 230. This duct means includes an abbreviated duct 254 within the lower portion of vertical duct 240 arranged to communicate with plenum chamber 248 through an opening 256 in the inner sheet 258 of oven side wall 238. Extending along opposite sides of the vertical duct 240 are a pair of vertical ducts 260 and 262, as best shown in FIGURES 6 and 7, which, at their upper ends, communicate with collecting duct 250 through openings 264 and 266 in the inner sheet 258 of oven side wall 238. The open lower ends of the ducts 260 and 262, and abbreviated duct 254 open into a common duct section 268, as best shown in FIGURE 7. The described duct means thus provides for passage of the air from plenum chamber 248 through opening 256 into abbreviated duct 254, then into common duct 268, from whence it flows upwardly through vertical ducts 260 and 262, and then through openings 264 and 266 into collecting duct 250.

As in the first form of the invention, means is provided for reversing the flow of air through the lower baking zone. To accomplish this, the abbreviated duct 254 is provided in a wall common to duct 240 with an opening 270 controlled by a hingedly mounted valve or damper 272, arranged to be operated, in well known manner, from outside the oven. When blowing air upwardly through lower baking zone 244, valve or damper 272 is disposed in its full line position to close opening 270. When it is desired to reverse the flow of air through lower baking zone 244, valve 272 is moved to its phantom line position to close the open lower end of abbreviated duct 254 and to open the opening 270, whereby air from duct 240 flows through opening 270 into abbreviated duct 254, and then through opening 256 into plenum chamber 248. In order to prevent the air in duct 240 from entering lower plenum chamber 242, the lower end of duct 240 where it communicates with duct 246 is provided with a blade 274 of a hingedly mounted double bladed valve or damper 276, which in its phantom line position closes the lower end of duct 240.

Figure 5:
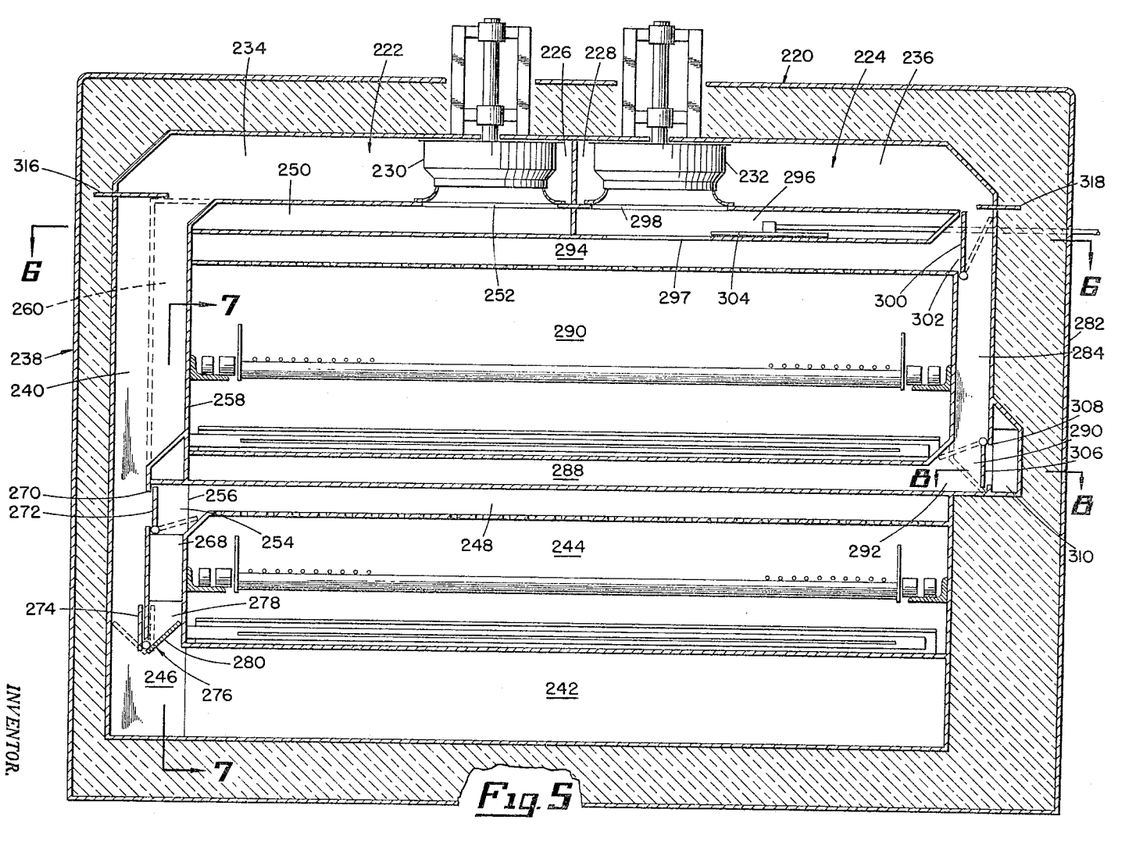
FIGURE 5 is a vertcial transverse sectional view through an oven showing a modified form of air circulating system.

Air from plenum chamber 248 blows downwardly through lower baking zone 244 into plenum chamber 242, from whence it is arranged to return to collecting duct 250 by the means now to be described. Connecting duct 278 communicates at its upper end with common duct 268 and at its lower end with duct 246, as best shown in FIGURES 5 and 7. With the double bladed valve 276 in its phantom line position, its blade 280 is disposed to open the lower end of connecting duct 278, whereby air from plenum chamber 242 flows through duct 246, connecting duct 278, common duct 268, and then through vertical return ducts 260 and 262 to the collecting duct 250. Thus, by appropriate manipulation of the valves or dampers 272 and 276, air can selectively be blown downwardly through lower baking zone 244 from plenum chamber 248 to plenum chamber 242, or upwardly through lower baking zone 244 from plenum chamber 242 to plenum chamber 248.

Within oven side wall 282 is a vertical duct 284 arranged to communicate at its upper end with the laterally outer end of distributing duct 224 and at its lower end with the lower plenum chamber 288 of upper baking zone 290 through inwardly directed duct or passage 292, whereby air from the discharge side of the fan 232 is introduced into plenum chamber 288. Air from plenum chamber 288 is directed upwardly through upper baking zone 290, as described in the first form of the invention, and is withdrawn therefrom into the upper plenum chamber 294 of the upper baking zone 290. Air from plenum chamber 294 is returned to collecting duct 296 through an opening 297 and thence through opening 298 to the intake side of the fan 232.

Figure 8:
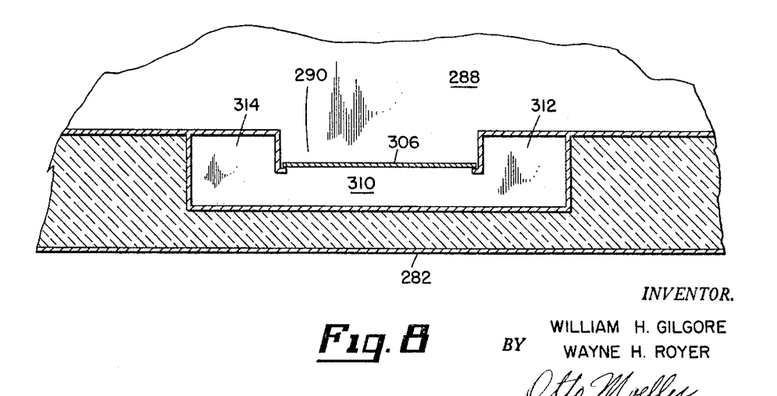
FIGURE 8 is a sectional view taken on line 8—8 of FIGURE 5.

As in the first form of the invention, means is provided for reversing the flow of air through the upper baking zone. To accomplish this, a valve or damper 300 is hingedly mounted in vertical duct 284 for movement between its solid line and phantom line positions, as shown in FIGURE 5. Upon moving valve or damper 300 from its solid to its phantom line position, air from the discharge side of the fan 232 is discharged through an opening 302 into upper plenum chamber 294, and flow of air through duct 284 to lower plenum chamber 288 is cut off. At the same time a slide valve or damper 304 is moved from its position as shown in FIGURE 5 to a position closing the opening 297, whereby the air is discharged downwardly through the upper baking zone 290 from upper plenum chamber 294. The air is withdrawn into lower plenum chamber 288, from which it passes into duct 290. A hingedly mounted valve or damper 306 is moved from its solid line to its phantom line position, as shown in FIGURE 5 to divert the air from duct 290 through opening 308 into an elongated longitudinally extending duct 310. The forward and rearward end portions of longitudinally extending duct 310 communicate with the lower ends of vertically extending ducts 312 and 314 disposed at opposite sides of vertical duct 284, which ducts 312 and 314 communicate at their upper ends with the collecting duct 296, as best shown in FIGURES 5, 6 and 8. From collecting duct 296, the air returns to the suction side of the fan 232 through opening 298.

Suitable means are provided for operating the valves or dampers 300, 304 and 306 from outside the oven. Thus, by appropriate manipulation of the valves or dampers 300, 304 and 306, it is apparent that air can selectively be blown downwardly through upper baking zone 290 from plenum chamber 294 to plenum chamber 288, or upwardly through upper baking zone 290 from plenum chamber 288 to plenum chamber 294.

A horizontally adjustable slide damper 316, adapted to be manipulated from outside the oven, is disposed in the upper end of vertical duct 240 for controlling the volume of air circulated upwardly or downwardly through the lower baking zone 244. A similar damper 318 disposed in the upper end of vertical duct 282 controls the volume of air circulated upwardly or downwardly through the upper baking zone 290.

In addition to permitting reversal of circulation of the air in the upper and lower baking zones of the oven, an important feature of the invention resides in the means whereby the direction of circulation of air in either zone is controlled independently of the direction of circulation of air in the other zone, whereby to provide extreme flexibility in the operation of the oven permitting baking of a large variety of different products under optimum conditions.

The double plenum chamber between the upper and lower baking zones, furthermore provides a double air insulator between the upper and lower baking zones whereby to facilitate maintenance of a desired temperature differential between the upper and lower baking zones. In the forms of the invention employing dual fans, maintenance of a desired temperature differential between the upper and lower baking zones is further facilitated, since the returning air from each baking zone is recirculated by its own individual fan.

While the invention has been shown in the drawings and hereinabove described with respect to a direct heated oven, it is apparent that the burners may be replaced by flues for indirectly heating the baking zones of the oven in a manner well known in the art.

We claim:

1. In an air circulating system for an oven provided with an endless conveyor having a horizontal product carrying run, walls forming rectangular shallow upper and lower plenum chambers in spaced relation above and below said product carrying run,
the walls of said chambers facing said product carrying run having a multiplicity of air openings directed toward said product carrying run,
fan means,
discharge duct means communicating with the discharge of said fan means,
collecting duct means communicating with the intake of said fan means,
a pair of duct means communicating respectively with said upper and lower plenum chambers, and
valve means associated with said pair of duct means operative between first and second positions for selectively providing communication between one of said pair of duct means and said discharge duct means and between the other of said pair of duct means and said collecting duct means in said first position of said valve means, and between the said one of said pair of duct means and said collecting duct means and between the said other of said pair of duct means and said discharge duct means in said second position of said valve means.

2. An air circulating system for an oven as set forth in claim 1 including heating means between the lower plenum chamber and the product carrying run of the endless conveyor.

3. In an air circulating system for an oven provided with an endless conveyor for transporting products to be baked therethrough in an upper and a lower longitudinally extending run, an imperforate partition between said upper and lower conveyor runs to provide in said oven an upper and a lower baking zone, upper and lower air enclosing means in said upper baking zone respectively disposed in spaced relation above and below said upper conveyor run and having a multiplicity of air openings directed toward said upper conveyor run, upper and lower air enclosing means in said lower baking zone respectively disposed in spaced relation above and below said lower conveyor run and having a multiplicity of air openings directed toward said lower conveyor run, fan means, duct means including valve means movable for selectively providing communication between the discharge of said fan means and the lower air enclosing means of said lower baking zone and between the intake of said fan means and the upper air enclosing means of said lower baking zone in a first position of said valve means, and between the discharge of said fan means and the upper air enclosing means of said lower baking zone and between the intake of said fan means and the lower air enclosing means of said lower baking zone in a second position of said valve means, and duct means including valve means movable for selectively providing communication between the discharge of said fan means and the lower air enclosing means of said upper baking zone and between the intake of said fan means and the upper air enclosing means of said upper baking zone in a first position of said last named valve means, and between the discharge of said fan means and the upper air enclosing means of said upper baking zone and between the intake of said fan means and the lower air enclosing means of said upper baking zone in a second position of said last named valve means.

4. An air circulating system for an oven as set forth in claim 3 including heating means between the upper conveyor run and the lower air enclosing means of said upper baking zone, and between the lower conveyor run and the lower air enclosing means of said lower baking zone.

5. In an air circulating system for an oven provided with an endless conveyor for transporting products to be baked therethrough in an upper and a lower longitudinally extending run, an imperforate horizontal partition between said upper and lower conveyor runs to provide in said oven an upper and a lower baking zone, upper and lower air enclosing means in said upper baking zone respectively disposed in spaced relation above and below said upper conveyor run and having a multiplicity of air openings directed toward said upper conveyor run, upper and lower air enclosing means in said lower baking zone respectively disposed in spaced relation above and below said lower conveyor run and having a multiplicity of air openings directed toward said lower conveyor run, first and second fan means, duct means including valve means movable for selectively providing communication between the discharge of said first fan means and the lower air enclosing means of said lower baking zone and between the intake of said first fan means and the upper air enclosing means of said lower baking zone in a first position of said valve means, and between the discharge of said first fan means and the upper air enclosing means of said lower baking zone and between the intake of said first fan means and the lower air enclosing means of said lower baking zone in a second position of said valve means, and duct means including valve means movable for selectively providing communication between the discharge of said second fan means and the lower air enclosing means of said upper baking zones and between the intake of said second fan means and the upper air enclosing means of said upper baking zone in a first position of said last named valve means, and between the discharge of said second fan means and the upper air enclosing means of said upper baking zone and between the intake of said second fan means and the lower air enclosing means of said upper baking zone in a second position of said last named valved means.

6. In an air circulating system for an oven provided with an endless conveyor for transporting products to be baked therethrough in an upper and a lower longitudinally extending run, an imperforate horizontal partition between said upper and lower conveyor runs extending from one side to the other of the oven to provide therein an upper and a lower baking zone, perforate horizontal partitions above and below said upper conveyor run providing in said upper baking zone an upper and a lower plenum chamber, perforate horizontal partitions above and below said lower conveyor run providing in said lower baking zone an upper and a lower plenum chamber, fan means, discharge duct means communicating with the discharge of said fan means, collecting duct means communicating with the intake of said fan means, a pair of duct means communicating respectively with the lower plenum chambers of said upper and lower baking zones, a pair of duct means communicating respectively with the upper plenum chambers of said upper and lower baking zones, and valve means operative between first and second positions for selectively providing communication between one of each of said pairs of duct means and said discharge duct means and between the other of each of said pairs of duct means and said collecting duct means in said first position of said valve means, and between the said one of each of said pairs of duct means and said collecting duct means and between the said other of each of said pairs of duct means and said discharge duct means in said second position of said valve means.

7. In an air circulating system for an oven provided with an endless conveyor for transporting products to be baked therethrough in an upper and a lower longitudinally extending run, an imperforate horizontal partition between said upper and lower conveyor runs to provide therein an upper and a lower baking zone, perforate horizontal partitions above and below said upper conveyor run providing in said upper baking zone an upper and a lower plenum chamber, perforate horizontal partitions above and below said lower conveyor run providing in said lower baking zone an upper and a lower plenum chamber, fan means, first duct means providing communication between the discharge of said fan means and the upper and lower plenum chambers of said lower baking zone and between the intake of said fan means and the upper and lower plenum chambers of said lower baking zone, valve means associated with said first duct means movable between first and second positions for selectively providing communication between the discharge of said fan means and the lower plenum chamber of said lower baking zone and between the intake of said fan means and the upper plenum chamber of said lower baking zone in said first position of said valve means, and between the discharge of said fan means and the upper plenum chamber of said lower baking zone and between the intake of said fan means and the lower plenum chamber of said lower baking zone in said second position of said valve means, second duct means providing communication between the discharge of said fan means and the upper and lower plenum chambers of said upper baking zone and between the intake of said fan means and the upper and lower plenum chambers of said upper baking zone, and valve means associated with said second duct means movable between first and second positions for selectively providing communication between the discharge of said fan means and the lower plenum chambers of said upper baking zone and between the intake of said fan means and the upper plenum chamber of said upper baking zone in said first position of said last named valve means, and between the discharge of said fan means and the upper plenum chamber of said upper baking zone and between the intake of said fan means and the lower plenum chamber of said upper baking zone in said second position of said last named valve means.

8. In an air circulating system for an oven provided with an endless conveyor for transferring products to be baked therethrough in an upper and a lower longitudinally extending run, an imperforate horizontal partition between said upper and lower conveyor runs to provide in said oven an upper and a lower baking zone, perforate horizontal partitions above and below said upper conveyor run providing in said upper baking zone an upper and a lower plenum chamber, perforate horizontal partitions above and below said lower conveyor run providing in said lower baking zone an upper and a lower plenum chamber, fan means disposed in the top of said oven, a pair of vertical ducts in each oven side wall, one of each of said pair of vertical ducts communicating with a respective lower plenum chamber of a respective baking zone, and the other of each of said pair of vertical ducts communicating with a respective upper plenum chamber of a respective baking zone, duct means including valve means movable for selectively providing communication between either of one of said pair of vertical ducts with the discharge or intake of said fan means, and duct means including valve means movable for selectively providing communication between either of the other of said pair of vertical ducts with the discharge or intake of said fan means.

9. In an air circulating system for an oven provided with an endless conveyor for transporting products to be baked therethrough in an upper and a lower longitudinally extending run, an imperforate horizontal partition between said upper and lower conveyor runs to provide in said oven an upper and a lower baking zone, perforate horizontal partitions above and below said upper conveyor run providing in said upper baking zone an upper and a lower plenum chamber, perforate horizontal partitions above and below said lower conveyor run providing in said lower baking zone an upper and a lower plenum chamber, a first and second fan means, a discharge duct communicating with the discharge of said first fan means and a discharge duct communicating with the discharge of said second fan means, a collecting duct communicating with the intake of said first fan means and a collecting duct communicating with the intake of said second fan means, a first pair of ducts respectively providing communication between the lower plenum chamber of said lower baking zone and both said discharge duct and collecting duct of said first fan means, and between the upper plenum chamber of said lower baking zone and both said discharge duct and collecting duct of said first fan means, a second pair of ducts respectively providing communication between the lower plenum chamber of said upper baking zone and both said discharge duct and collecting duct of said second fan means, and between the upper plenum chamber of said upper baking zone and both said discharge duct and collecting duct of said second fan means, valve means associated with said first pair of ducts movable for selectively providing communication between either of said first pair of ducts and one or the other of the discharge and collecting ducts of said first fan means, and valve means associated with said second pair of ducts movable for selectively providing communication between either of said second pair of ducts and one or the other of the discharge and collecting ducts of said second fan means.

References Cited by the Examiner
UNITED STATES PATENTS

| | | | |
|---|---|---|---|
| 2,236,085 | 3/1941 | Cook | 107—63 |
| 2,762,321 | 9/1956 | Cook | 107—63 |
| 2,938,473 | 5/1960 | Mahoney et al. | 107—55 |

WALTER A. SCHEEL, *Primary Examiner.*